(12) United States Patent
Lind et al.

(10) Patent No.: US 7,669,080 B2
(45) Date of Patent: Feb. 23, 2010

(54) REDUCING LIKELIHOOD OF DATA LOSS DURING FAILOVERS IN HIGH-AVAILABILITY SYSTEMS

(75) Inventors: Jon A. Lind, Beaverton, OR (US); Dale M. McInnis, Aurora (CA); Steven R. Pearson, Portland, OR (US); Steve Raspudic, Mississauga (CA); Vincent Kulandaisamy, Portland, OR (US); Yuke Zhuge, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/839,739

(22) Filed: Aug. 16, 2007

(65) Prior Publication Data

US 2009/0049329 A1    Feb. 19, 2009

(51) Int. Cl.
*G06F 11/00* (2006.01)

(52) U.S. Cl. .............................................. 714/11; 714/5
(58) Field of Classification Search .................. 714/5, 714/11, 13
See application file for complete search history.

(56) References Cited

U.S. PATENT DOCUMENTS

| | | | | |
|---|---|---|---|---|
| 5,799,322 | A * | 8/1998 | Mosher, Jr. ................. | 707/202 |
| 7,003,694 | B1 | 2/2006 | Anderson, Jr. et al. | |
| 7,058,853 | B1 | 6/2006 | Kavanappillil et al. | |
| 7,120,824 | B2 * | 10/2006 | Burton et al. .................. | 714/6 |
| 7,577,868 | B2 * | 8/2009 | Aidun ........................... | 714/6 |
| 2002/0198996 | A1 | 12/2002 | Sreenivasan et al. | |
| 2005/0144521 | A1 * | 6/2005 | Werner ......................... | 714/20 |
| 2005/0172161 | A1 | 8/2005 | Cruz et al. | |
| 2006/0117212 | A1 | 6/2006 | Meyer et al. | |
| 2006/0150006 | A1 * | 7/2006 | Mizutani ...................... | 714/11 |
| 2006/0179147 | A1 | 8/2006 | Tran et al. | |
| 2006/0179347 | A1 | 8/2006 | Anderson, Jr. et al. | |
| 2006/0190775 | A1 | 8/2006 | Aggarwal et al. | |
| 2006/0209677 | A1 | 9/2006 | McGee et al. | |
| 2007/0028065 | A1 | 2/2007 | Spear et al. | |
| 2007/0078982 | A1 | 4/2007 | Aidun et al. | |
| 2009/0037765 | A1 * | 2/2009 | Graham et al. .................. | 714/5 |

OTHER PUBLICATIONS

"No Data Loss Standby Database: The Benefits of Combining EMC Symmetrix Remote Data Facility (SRDF) with Oracle8i Automated Standby Database," Oracle Corporation, EMC Global Communications publisher, Feb. 15, 2001, 22 pages.

"High Availability FailOver/iX Manual: HP e3000 MPE/iX Computer Systems," Edition 1, Hewlett Packard, U.S.A. Nov. 2000, 59 pages.

* cited by examiner

*Primary Examiner*—Marc Duncan

(57) ABSTRACT

A method, system, and computer program product for reducing likelihood of data loss during performance of failovers in a high-availability system comprising a primary system and a standby system are provided. The method, system, and computer program product provide for defining a halt duration, periodically determining a halt end time, halting data modifications at the primary system responsive to failure of data replication to the standby system, resuming data modifications at the primary system responsive to a last determined halt end time being reached or data replication to the standby system resuming, and responsive to the primary system failing prior to a previously determined halt end time, determining that a failover to the standby system will not result in data loss on the standby system with respect to the primary system.

21 Claims, 5 Drawing Sheets

REDUCING LIKELIHOOD OF DATA LOSS DURING FAILOVERS IN HIGH-AVAILABILITY SYSTEMS

FIELD OF THE INVENTION

The present invention relates generally to reducing likelihood of data loss during failovers in high-availability systems.

BACKGROUND OF THE INVENTION

In high-availability systems, data replication from primary systems to standby systems sometimes fails as a result of, for instance, failure of a connection between a primary system and a standby system. When data replication fails, if the primary system continues to process data modification requests, then the standby system will not have up-to-date data. Hence, if the primary system subsequently fails and a failover to the standby system is performed, then data loss will occur because data modifications made after data replication failure and before primary system failure will be missing from the standby system.

SUMMARY OF THE INVENTION

A method, system, and computer program product for reducing likelihood of data loss during performance of failovers in a high-availability system comprising a primary system and a standby system are provided. The method, system, and computer program product provide for defining a halt duration, the halt duration being a duration in which the primary system will halt data modifications when data replication to the standby system fails, periodically determining a halt end time by adding the halt duration to a current time, halting data modifications at the primary system responsive to failure of data replication to the standby system, resuming data modifications at the primary system responsive to a last determined halt end time being reached or data replication to the standby system resuming, responsive to the primary system failing prior to a previously determined halt end time, determining that a failover to the standby system will not result in data loss on the standby system with respect to the primary system.

DETAILED DESCRIPTION

Figure 1:
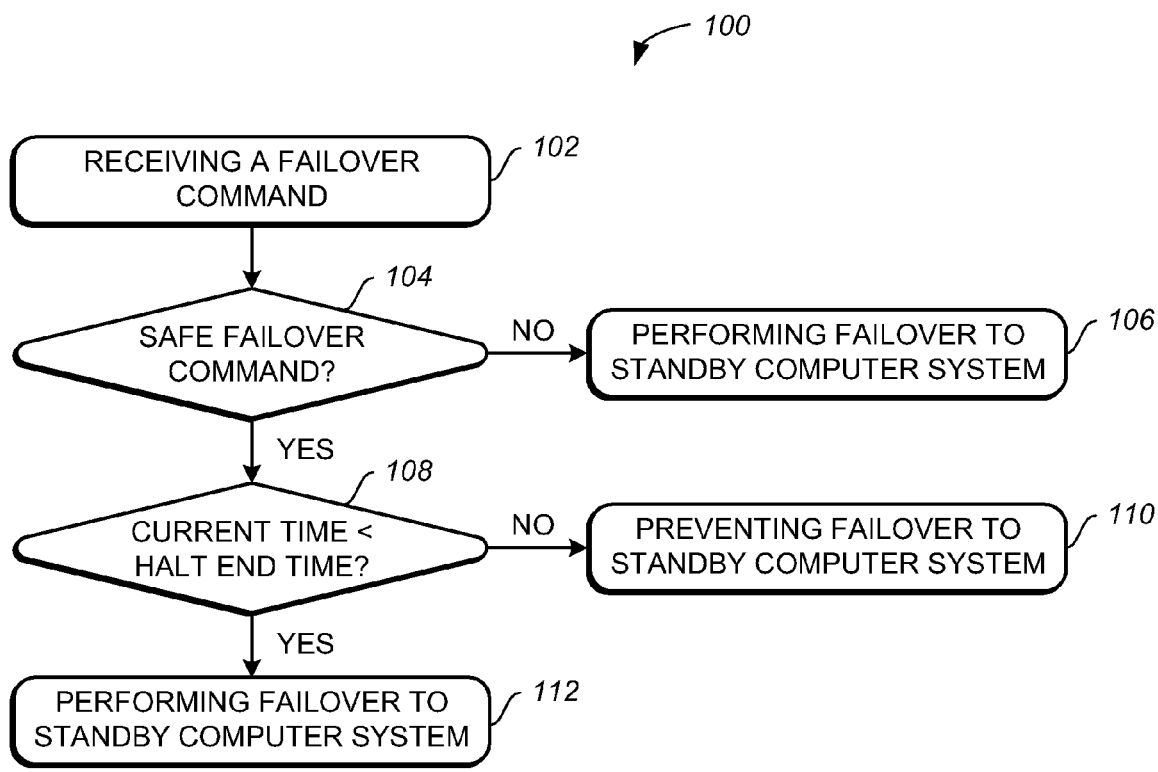
FIG. 1 depicts a process for reducing likelihood of data loss during performance of failovers in a high-availability system according to an implementation of the invention.

The present invention generally relates to reducing likelihood of data loss during performance of failovers in high-availability systems. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

High-availability systems are systems that include a primary system, which may be composed of one or more computer systems, and a standby system, which may also be composed of one or more computer systems. The primary system maintains data and processes requests to retrieve and modify the data. The standby system maintains a backup of the data maintained at the primary system. When data maintained at the primary system is modified, data modifications are replicated to the standby system. Hence, if the primary system fails, the standby system can take the place of the failed primary system and continue to process data retrieval and modification requests. This is referred to as a failover. Because the standby system has a backup of the data maintained at the primary system, users will experience little or no interruption. As a result, high-availability systems provide higher availability (e.g., less down time) than systems without a standby system.

Data replication from a primary system to a standby system sometimes fails due to, for instance, failure of the standby system, failure of a connection between the primary system and the standby system, or the like. If data replication fails and data modifications are allowed to continue on the primary system, then the standby system may not have the latest version of the data. Thus, if the primary system subsequently fails and a failover to the standby system is performed, then data loss will result as data modifications made after data replication failure and before primary system failure will be missing from the standby system.

To avoid data loss in a failover, a primary system can be configured to halt data modifications when data replication to a standby system fails. A high-availability system, however, then becomes less available than a system without a standby system because the high-availability system will be functional only when the primary system, the standby system, and the connection between the primary system and the standby system are functional. Users who can tolerate some risk of data loss usually prefer to continue data modifications on the primary system, even when the data modifications cannot be replicated to the standby system and will be lost forever if a failover occurs. Users who cannot tolerate data loss will usually configure the primary system to halt data modifications when the primary system cannot replicate to the standby system.

When a primary system is configured to continue data modification even after data replication to a standby system is not possible, it is often difficult to determine if the primary system performed any data modifications that have not been replicated to the standby system. One reason is because the primary system may be inaccessible after it fails. Hence, determining whether the primary system processed any data modifications after data replication ceased may be impossible. Consequently, if a failover is performed, there is a risk of data loss. Being able to determine whether a failover will cause data loss is valuable to users who are faced with choosing between failing over to the standby system or attempting to repair and restart the primary system.

One way to determine the possibility of data loss in a failover is to configure a primary system to send events, such as data replication failure, to a third system, and continue data modifications after data replication failure so that a user can use the information on the third system to decide whether to failover to a standby system. Events cannot be sent to the standby system because data replication failure implies that the standby system is not accessible from the primary system.

Having a third system, however, complicates system set-up as another connection will need to be set up between the primary system and the third system. Multiple connections may involve implementing multiple communication networks. In addition, if the connection between the primary system and the third system also fails, then the primary system will still have to decide whether to continue data modification or not. Adding a third system only results in a more robust standby system, it does not solve the root problem.

Depicted in FIG. 1 is a process 100 for reducing likelihood of data loss during performance of failovers in a high-availability system according to an implementation of the invention. The high-availability system comprises a primary system and a standby system. The primary system and the standby system may each be composed of one or more computer systems. At 102, a failover command is received. In one implementation, the failover command is received at the standby system.

The failover command may be received in response to failure of the primary system. Failure of the primary system may be a partial failure (e.g., failure of one or more components of the primary system) or a complete failure (e.g., total shut down of the primary system). In addition, failure of the primary system may be detected by the primary system itself, the standby system, a user (e.g., system administrator), or some other system. The failover command may be issued by the primary system (depending on degree of failure), a user, the standby system, or some other system.

As an example, when a user is informed of primary system failure, the user may issue a failover command by inputting the failover command at the standby system, sending the failover command from another system, or something similar. To give another example, an application executing on the standby system or another system may be responsible for monitoring the primary system and issuing a failover command when failure of the primary system is detected.

At 104, a determination is made as to whether the failover command is a safe failover command (e.g., a command to failover only if certain conditions are satisfied). If the failover command is not a safe failover command, then at 106, a failover to the standby system is performed. However, if the failover command is a safe failover command, then at 108, a current time is compared to a halt end time received from the primary system to determine whether the current time is before (e.g., earlier than, prior to, and so forth) the halt end time. In one implementation, the halt end time is a last of a plurality of halt end times received from the primary system.

The halt end time is an earliest time at which the primary system will resume data modifications when data replication to the standby system fails. As discussed above, sometimes data replication from the primary system to the standby system will not be possible due to, for instance, failure of a connection (e.g., network) between the primary system and the standby system.

Rather than immediately continuing data modifications at the primary system or preventing data modifications from proceeding at the primary system until data replication can resume, which could be an extensive amount of time, the primary system periodically sends a halt end time to inform the standby system, a user, or the like, that data modification at the primary system will be halted until the halt end time if data replication fails as a result of the standby system becoming inaccessible to the primary system.

Hence, whether performance of a failover to the standby system will result in a loss of data can be determined when the primary system fails. Specifically, if a time at which the primary system failed is before a last halt end time received from the primary system, then the primary system did not process any data modifications that have not been replicated to the standby system prior to failure. This provides a simple and reliable way to determine if a failover will cause data loss or not, without needing additional systems, networks, or the like.

Being able to determine risk of data loss also gives a user, such as a system administrator, valuable information if the user is charged with deciding between failing over to a standby system or attempting to repair and restart the primary system. Other solutions would require indefinitely halting data modifications on the primary system when data replication is not possible in order to guarantee no data loss in a failover.

In one implementation, the halt end time is calculated by adding a primary halt duration (e.g., 10 minutes) to a time at which the halt end time is being calculated. The primary halt duration may be user-configurable. This is in contrast to other solutions that only have a choice of halting or not halting data modification. Accordingly, users have the ability to fine tune high-availability systems to their specific business needs, preferences, and so forth.

Referring back to FIG. 1, if it is determined at 108 that the current time is not before the halt end time, then, at 110, a failover to the standby system is not performed. This reduces a likelihood of data loss resulting from performance of a failover to the standby system. On the other hand, if it is determined at 108 that the current time is before the halt end time, then, at 112, a failover to the standby system is performed such that the standby system takes over processing for the primary system.

Thus, when failover is performed, it guarantees that there will be no data loss. On the other hand, if the command does not proceed with failover, it is only an indication that there is a risk of data loss. If a failover is performed even though the current time is after the halt end time, there may or may not be data loss. More information, such as from examining the primary system to see if it indeed performed any data modifications after replication to the standby failed, will be needed to determine the possibility and extent of data loss.

By providing an optional safe failover command that can guarantee that only a no-data-loss failover will be performed, a system can be configured to automatically issue a safe failover command whenever primary system failure is detected. Failover decisions when data loss is possible can be referred to designated personnel or handled by other protocols.

Figure 2:
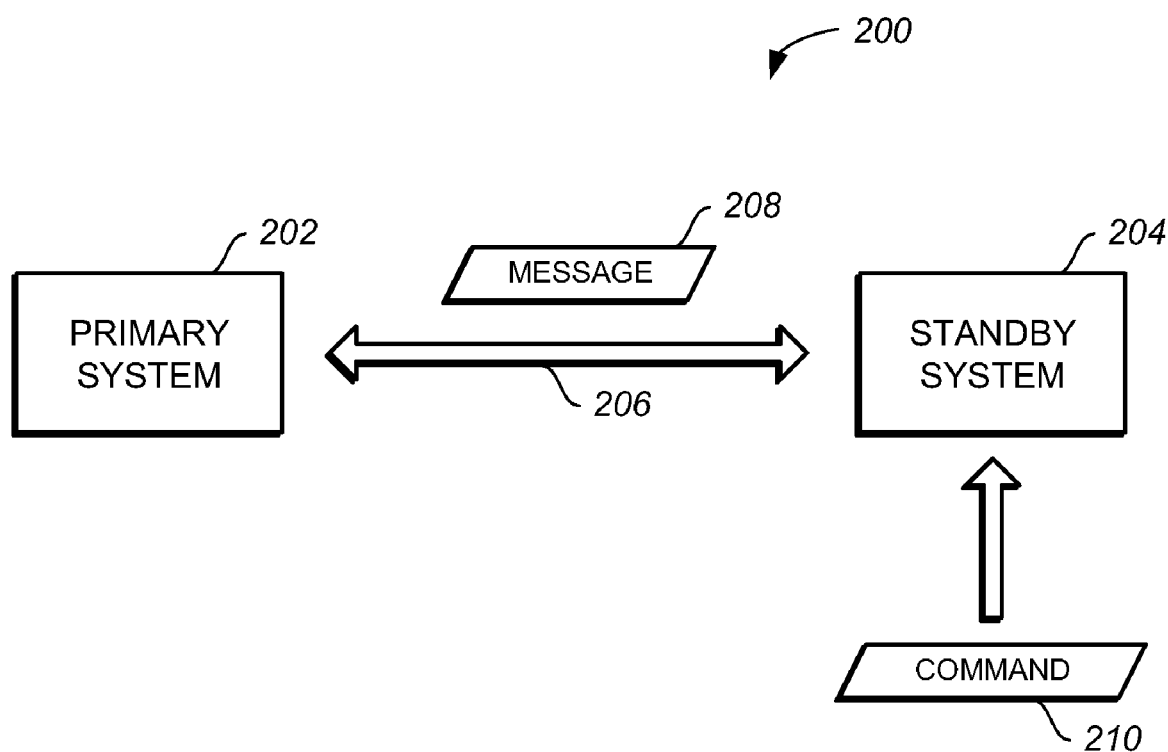
FIG. 2 illustrates a high-availability system according to an implementation of the invention.

FIG. 2 illustrates a high-availability system 200 according to an implementation of the invention. High-availability system 200 includes a primary system 202 and a standby system 204. Primary system 202 and standby system 204 are each a computer system in one implementation. In another implementation, primary system 202 and standby system 204 each comprises a cluster of computer systems. In FIG. 2, primary system 202 and standby system 204 communicate with one another via a connection 206. Connection 206 may be a wired network, a wireless network, a physical wire, or other communication medium.

As seen in FIG. 2, primary system 202 will send messages 208 to standby system 204. Messages 208 may be sent at regular intervals or as needed (e.g., when data modifications processed at primary system 202 need to be replicated to standby system 204). When primary system 202 sends a message 208 to standby system 204, primary system 202 may include a halt end time in message 208. Primary system 202 will halt data modification until at least the halt end time if, for some reason, it cannot replicate data to standby system 204.

In one implementation, the halt end time is calculated using a primary halt duration. The primary halt duration is a value that can be set by a user (e.g., system administrator) to dictate how long a primary system is to cease processing data modifications when data replication to a standby system is not possible. The value can be set in accordance with the user's needs, preferences, and so forth. For instance, if a user prefers to never halt data modification at the primary system, even when data replication has failed, then the primary halt duration can be set to zero. On the other hand, if a user prefers to halt data modification at the primary system until data replication has resumed, then the primary halt duration can be set to infinity.

The halt end time may be maintained by primary system 202 as a timestamp that is calculated by adding a current time to a primary halt duration that has been set. The primary halt duration may default to a value if it has not been set by a user. Because the halt end time involves current time, it is logically changing continuously. Primary system 202, however, can be configured to update the timestamp corresponding to the halt end time at intervals equal to the primary halt duration or at intervals smaller than the primary halt duration. For example, the halt end time can be updated at quarter (¼) intervals of the primary halt duration. A new halt end time may be sent by primary system 202 to standby system 204 each time it is updated.

When data replication to standby system 204 actually fails as a result of, for instance, failure of connection 206, primary system 202 may be configured to halt data modification until a last halt end time sent to standby system 204, or until the primary halt duration has elapsed since a time that data replication failed, which may end up being later than the last halt end time.

In FIG. 2, a failover command 210 is received by standby system 204 after failure of primary system 202 is detected. As discussed above, failover command 210 may be issued by, for example, a user or an application. Standby system 204 determines whether failover command 210 is a safe failover command (e.g., allow command 210 to proceed only if a last halt end time received by standby system 204 has not been reached). A flag can be used to indicate whether failover command 210 is a safe failover command. Hence, standby system 204 can determine whether failover command 210 is a safe failover command by determining whether the flag has been set.

If standby system 204 determines that failover command 210 is a safe failover command, then standby system 204 will compare a current time to the last halt end time received to determine whether the current time is less than (e.g., earlier than) the last halt end time received. Standby system 204 will allow command 210 to proceed (e.g., perform the failover) if the current time is less than the last halt end time received. Otherwise, standby system 204 will prevent command 210 from proceeding. Thus, failover command 210 will be allowed to proceed only if standby system 204 can be certain that there is no chance of data loss if a failover is performed.

Figure 3:
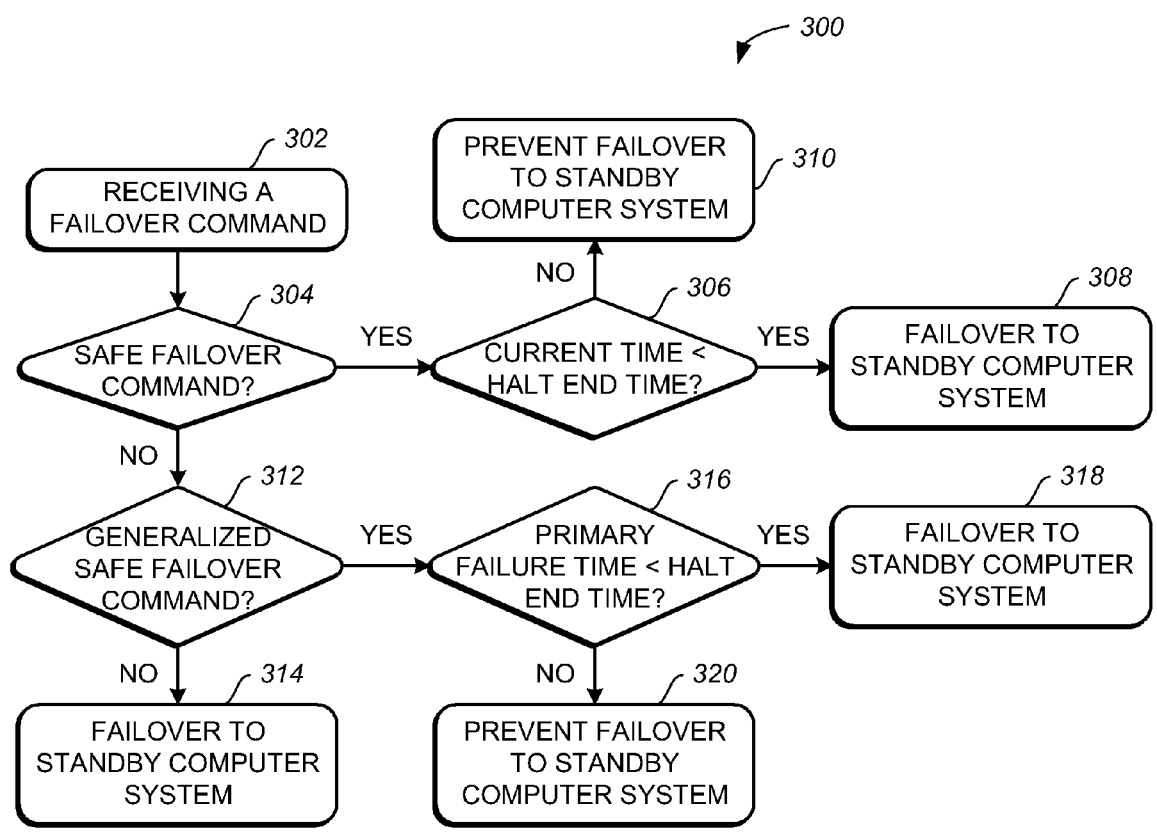
FIG. 3 shows a process for reducing likelihood of data loss during performance of failovers in a high-availability system according to an implementation of the invention.

Shown in FIG. 3 is a process 300 for reducing likelihood of data loss during performance of failovers in a high-availability system according to an implementation of the invention. At 302, a failover command is received. At 304, a determination is made as to whether the failover command received is a safe failover command. If it is determined at 304 that a safe failover command has been received, then at 306, a current time is compared to a last halt end time received to determine whether the current time is less than (e.g., earlier than) the halt end time.

When the halt end time is greater than the current time, then at 308, the failover command is allowed to proceed and failover to a standby system is performed. When the halt end time is not greater than the current time, then at 310, the failover command is not allowed to proceed.

If it is determined at 304 that the failover command is not a safe failover command, a determination is made at 312 as to whether the failover command is a generalized safe failover command. When the failover command is neither a safe failover command nor a generalized safe failover command, failover to the standby system is performed at 314.

On the other hand, if the failover command is a generalized safe failover command, at 316, a primary failure time is compared to the last halt end time received to determine whether the primary failure time is less than the last halt end time. The primary failure time may be a timestamp that is determined upon detecting failure of the primary system and represents a time that is no earlier than the actual failure time of the primary system, after which time the primary system could not have performed any further data modifications.

Using a timestamp that is later than the actual failure time of the primary system ensures that a failover with data loss will not be performed. However, using a timestamp that is later than the actual failure time of the primary system may prevent a failover from being performed even though there is no risk of data loss. In one implementation, the primary failure time is passed as an argument of the generalized safe failover command.

When the primary failure time is before the last halt end time received, failover to the standby system is performed at 318. If the primary failure time is not earlier than the last halt end time received, the failover command is prevented from proceeding at 320.

The previously described safe failover command is a specialized form of the generalized safe failover command where the implied primary failure time is the current time. The safe failover command can be issued conveniently as there is no need to generate a timestamp for the primary failure time. However, the generalized safe failover command may be useful when the failover command is not issued until after the halt end time has passed, which may occur if detection of primary system failure is delayed but the known primary failure time is still earlier than the last halt end time.

Safe failover commands require clock synchronization on the primary system and the standby system because it compares primary halt end time, which is based on the primary system's clock, with the current time based on the standby system's clock. Because the clocks of the primary system and standby system may differ by a few seconds even with clock synchronization, a predetermined margin may need to be taken into account when comparing the halt end time to the current time.

In one implementation, the predetermined margin is set to a value that is greater than or equal to a largest possible synchronization error between the clocks of the two systems. For instance, if the two clocks are synchronized within 2 seconds of one another, then a 5-second margin can be used. Hence, in order for a safe failover command to proceed, a current time of the standby system may need to be less than a last halt end time received from the primary system by at least a predetermined margin.

The generalized safe failover command compares primary failure time with primary halt end time. This requires that primary failure time be based on a clock that is synchronized with the primary system's clock or an adjustment be made when providing primary failure time to the command. An implementation may choose to use a predetermined margin when comparing those timestamps. Alternatively, an implementation may require that the primary failure time used has already been adjusted to the primary system's clock, possibly taking a margin into account.

A high-availability system according to an implementation of the invention may be configured such that users will be allowed to query a current halt end time at a primary system and/or a last halt end time received by a standby system. Users can then make failover decisions based on this information. For example, a user can check to see whether a safe failover command will succeed without actually issuing the command.

Figure 4:
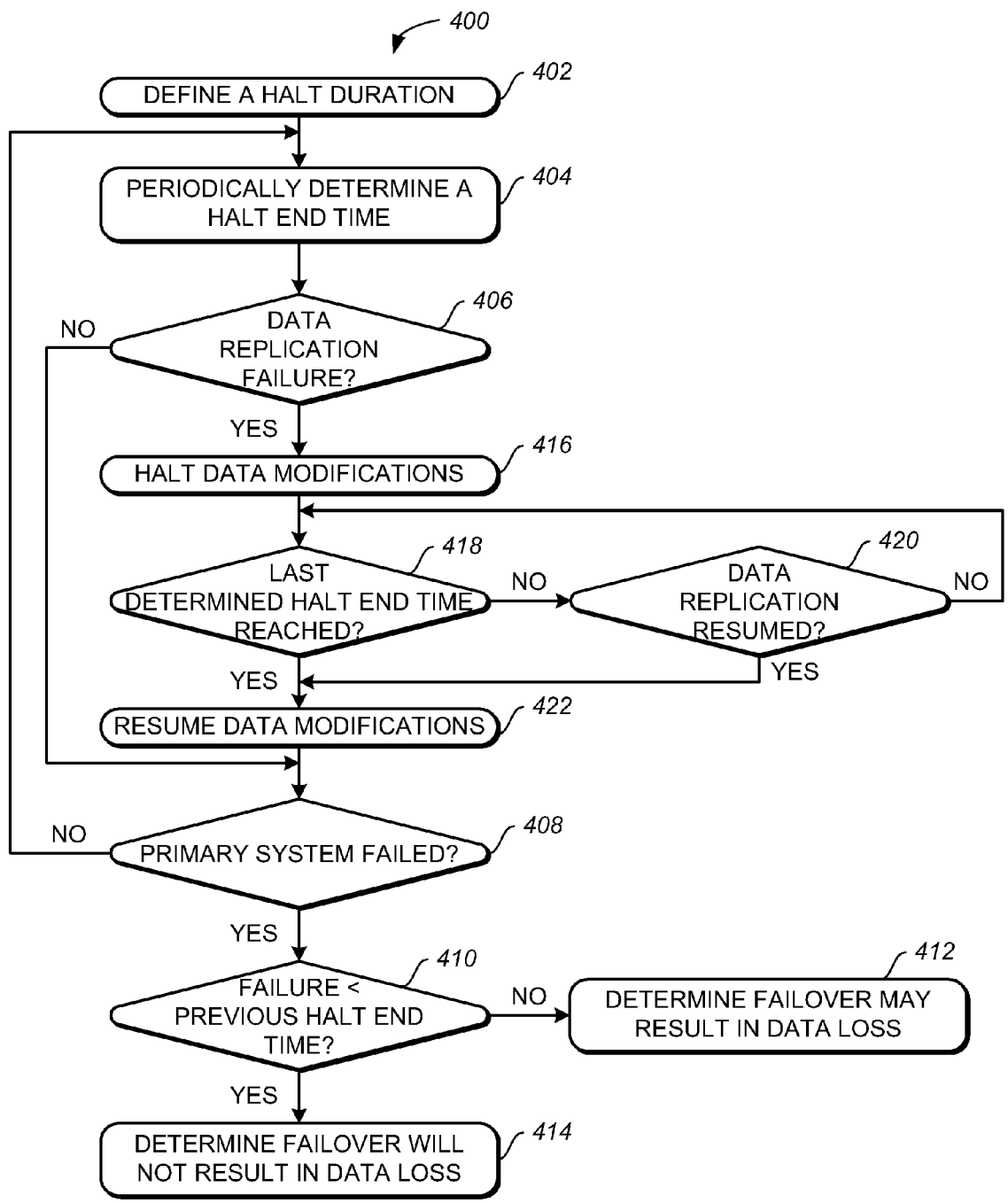
FIG. 4 depicts a process for reducing likelihood of data loss during performance of failovers in a high-availability system according to an implementation of the invention.

FIG. 4 depicts a process 400 for reducing likelihood of data loss during performance of failovers in a high-availability system comprising a primary system and a standby system according to an implementation of the invention. At 402, a halt duration is defined. The halt duration is a duration in which the primary system will halt data modifications when data replication to the standby system fails.

At 404, a halt end time is periodically determined by adding the halt duration to a current time. In one implementation, the halt end time is determined by adding the halt duration to a time at which data replication to the standby system failed. The standby system, a third computer system, or a high-availability administration system may be periodically notified of the halt end time.

At 406, a determination is made as to whether data replication to the standby system has failed. If data replication to the standby system has not failed, a determination is made at 408 as to whether the primary system has failed. If the primary system has not failed, process 400 returns to 404. If the primary system has failed, a determination is made at 410 as to whether failure of the primary system was prior to a previously determined halt end time.

If failure of the primary system was not prior to the previously determined halt end time, then at 412, it is determined that a failover to the standby system may result in data loss on the standby system with respect to the primary system. However, if failure of the primary system was prior to the previously determined halt end time, then at 414, it is determined that a failover to the standby system will not result in data loss on the standby system with respect to the primary system.

Returning to 406, if it is determined that data replication to the standby system has failed, then at 416, data modifications at the primary system are halted. At 418, a determination has made as to whether a last determined halt end time has been reached. If the last determined halt end time has not been reached, a determination is made at 420 as to whether data replication to the standby system has resumed. If data replication to the standby system has not resumed, process 400 returns to 418. However, if it is determined at 418 that the last determined halt end time has been reached or if it is determined at 420 that data replication to the standby system has resumed, data modifications at the primary system are resumed.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
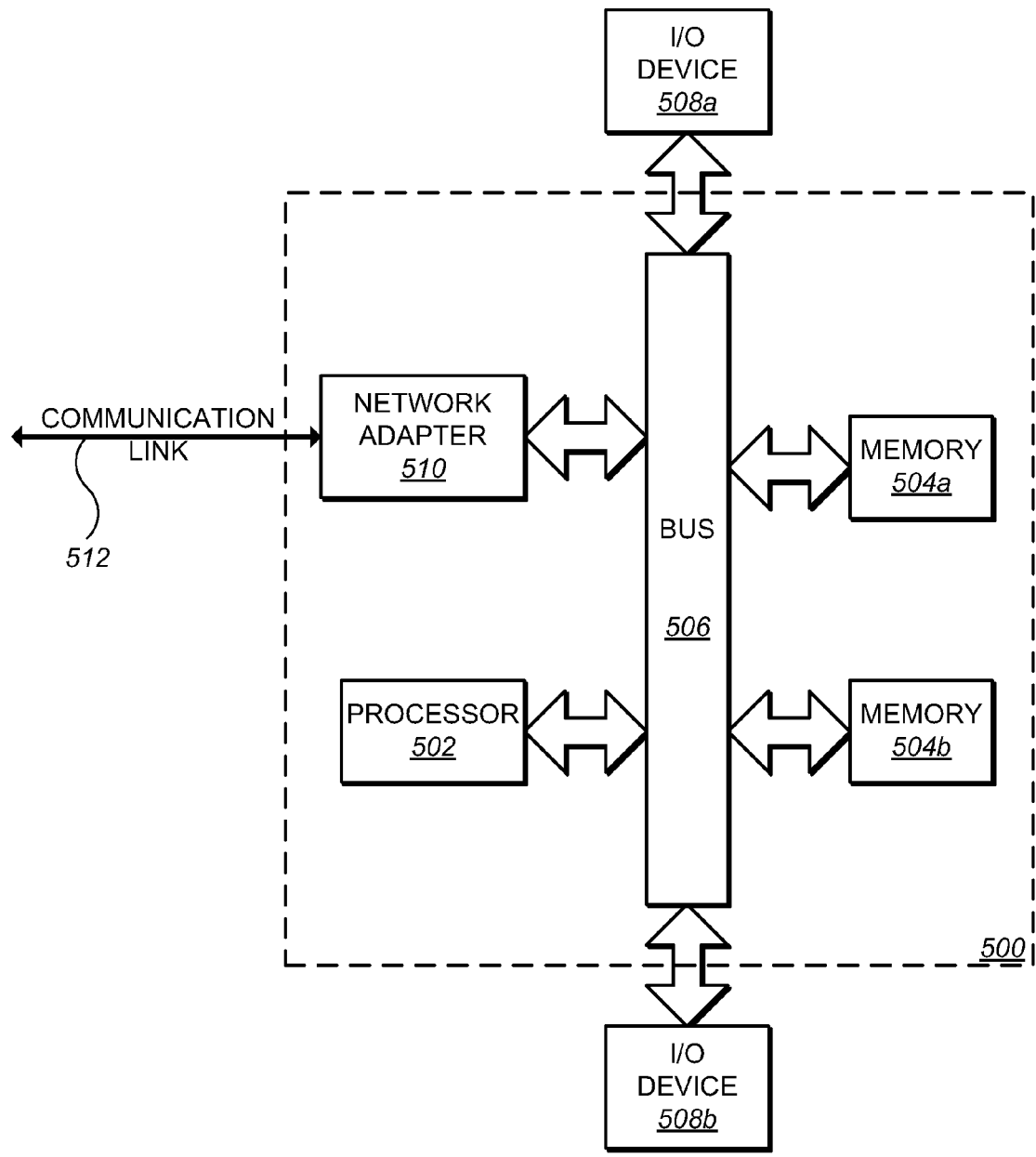
FIG. 5 illustrates a block diagram of a data processing system with which implementations of the invention can be implemented.

Illustrated in FIG. 5 is a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In FIG. 5, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for reducing likelihood of data loss during performance of failovers in high-availability systems have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A method for reducing likelihood of data loss during performance of failovers in a high-availability system comprising a primary system and a standby system, the method comprising:

defining a halt duration, the halt duration being a duration in which the primary system will halt data modifications when data replication to the standby system fails;

periodically determining a halt end time by adding the halt duration to a current time;

halting data modifications at the primary system responsive to failure of data replication to the standby system;

resuming data modifications at the primary system responsive to a last determined halt end time being reached or data replication to the standby system resuming; and responsive to the primary system failing prior to a previously determined halt end time, determining that a failover to the standby system will not result in data loss on the standby system with respect to the primary system.

2. The method of claim 1, further comprising:
periodically notifying the standby system, a third computer system, or a high-availability administration system of the last determined halt end time.

3. The method of claim 1, wherein periodically determining a halt end time comprises:
adding the halt duration to a time at which data replication to the standby system failed.

4. The method of claim 1, further comprising:
receiving a failover command, the failover command being a command to perform a failover from the primary system to the standby system;
determining whether the failover command is a safe failover command; and
responsive to the failover command being a safe failover command,
comparing a current time to a last halt end time received from the primary system,
responsive to the current time being before the last halt end time received, performing the failover to the standby system such that the standby system takes over processing for the primary system, and
responsive to the current time not being before the last halt end time received, preventing performance of the failover to the standby system.

5. The method of claim 4, wherein the failover to the standby system is performed only when the current time is earlier than the last halt end time received by a predetermined margin.

6. The method of claim 1, further comprising:
determining whether the failover command is a generalized safe failover command; and
responsive to the failover command being a generalized safe failover command,
comparing a primary failure time to a last halt end time received, the primary failure time being a time at which the primary system failed,
responsive to the primary failure time being before the last halt end time received, performing the failover to the standby system, and
responsive to the primary failure time not being before the last halt end time received, preventing performance of the failover to the standby system.

7. The method of claim 6, wherein the failover to the standby system is performed only when the current time is earlier than the last halt end time received by a predetermined margin.

8. A high-availability system comprising:
a standby system; and
a primary system in communication with the standby system, the primary system
defining a halt duration, the halt duration being a duration in which the primary system will halt data modifications when data replication to the standby system fails,
periodically determining a halt end time by adding the halt duration to a current time,
halting data modifications responsive to failure of data replication to the standby system, and
resuming data modifications responsive to a last determined halt end time being reached or data replication to the standby system resuming,
responsive to the primary system failing prior to a previously determined halt end time, the standby system determines that a failover to the standby system will not result in data loss on the standby system with respect to the primary system.

9. The high-availability system of claim 8, wherein the primary system
periodically notifies the standby system, a third computer system, or a high-availability administration system of the last determined halt end time.

10. The high-availability system of claim 8, wherein the halt end time is periodically determined by adding the halt duration to a time at which data replication to the standby system failed.

11. The high-availability system of claim 8, wherein the standby system
receives a failover command, the failover command being a command to perform a failover from the primary system to the standby system;
determines whether the failover command is a safe failover command; and
responsive to the failover command being a safe failover command,
compares a current time to a last halt end time received from the primary system,
responsive to the current time being before the last halt end time received, performs the failover to the standby system such that the standby system takes over processing for the primary system, and
responsive to the current time not being before the last halt end time received, prevents performance of the failover to the standby system.

12. The high-availability system of claim 11, wherein the failover to the standby system is performed only when the current time is earlier than the last halt end time received by a predetermined margin.

13. The high-availability system of claim 8, wherein the standby system
determines whether the failover command is a generalized safe failover command; and
responsive to the failover command being a generalized safe failover command,
compares a primary failure time to a last halt end time received, the primary failure time being a time at which the primary system failed,
responsive to the primary failure time being before the last halt end time received, performs the failover to the standby system, and
responsive to the primary failure time not being before the last halt end time received, prevents performance of the failover to the standby system.

14. The high-availability system of claim 13, wherein the failover to the standby system is performed only when the current time is earlier than the last halt end time received by a predetermined margin.

15. A computer program product comprising a computer-readable medium, the computer-readable medium being encoded with a computer program for reducing likelihood of data loss during performance of failovers in a high-availability system, wherein the computer program, when executed on a computer, causes the computer to:

define a halt duration, the halt duration being a duration in which the primary system will halt data modifications when data replication to the standby system fails;

periodically determine a halt end time by adding the halt duration to a current time;

halt data modifications at the primary system responsive to failure of data replication to the standby system;

resume data modifications at the primary system responsive to a last determined halt end time being reached or data replication to the standby system resuming; and responsive to the primary system failing prior to a previously determined halt end time, determine that a failover to the standby system will not result in data loss on the standby system with respect to the primary system.

16. The computer program product of claim 15, wherein the computer program further causes the computer to:

periodically notify the standby system, a third computer system, or a high-availability administration system of the last determined halt end time.

17. The computer program product of claim 15, wherein the halt end time is periodically determined by adding the halt duration to a time at which data replication to the standby system failed.

18. The computer program product of claim 15, wherein the computer program further causes the computer to:

receive a failover command, the failover command being a command to perform a failover from the primary system to the standby system;

determine whether the failover command is a safe failover command; and responsive to the failover command being a safe failover command, compare a current time to a last halt end time received from the primary system, responsive to the current time being before the last halt end time received, perform the failover to the standby system such that the standby system takes over processing for the primary system, and responsive to the current time not being before the last halt end time received, prevent performance of the failover to the standby system.

19. The computer program product of claim 18, wherein the failover to the standby system is performed only when the current time is earlier than the last halt end time received by a predetermined margin.

20. The computer program product of claim 15, wherein the computer program further causes the computer to:

determine whether the failover command is a generalized safe failover command; and responsive to the failover command being a generalized safe failover command, compare a primary failure time to a last halt end time received, the primary failure time being a time at which the primary system failed, responsive to the primary failure time being before the last halt end time received, perform the failover to the standby system, and responsive to the primary failure time not being before the last halt end time received, prevent performance of the failover to the standby system.

21. The computer program product of claim 20, wherein the failover to the standby system is performed only when the current time is earlier than the last halt end time received by a predetermined margin.

* * * * *